United States Patent
Atsumi et al.

(10) Patent No.: US 7,388,992 B2
(45) Date of Patent: Jun. 17, 2008

(54) DIGITAL PHOTOGRAPHIC DEVICE FOR CONTROLLING COMPRESSION PARAMETER OF IMAGE DATA AND METHOD OF DECIDING COMPRESSION PARAMETER VALUE OF IMAGE DATA

(75) Inventors: Eiji Atsumi, Kamakura (JP);
Kazunobu Shin, Frisco, TX (US);
Yusuke Toriumi, Sumida-ku (JP)

(73) Assignee: Nokia Corporation, Espoo (FI)

( * ) Notice: Subject to any disclaimer, the term of this patent is extended or adjusted under 35 U.S.C. 154(b) by 337 days.

(21) Appl. No.: 11/314,110

(22) Filed: Dec. 20, 2005

(65) Prior Publication Data
US 2006/0192860 A1    Aug. 31, 2006

Related U.S. Application Data

(63) Continuation of application No. PCT/JP03/08038, filed on Jun. 25, 2003.

(51) Int. Cl.
G06K 9/36 (2006.01)
G06K 9/38 (2006.01)
G06K 9/46 (2006.01)

(52) U.S. Cl. .................. 382/232; 382/253

(58) Field of Classification Search ............ 382/232, 382/233, 239, 246, 250, 251, 253, 298, 299, 382/305; 375/240.03, 240.16, 240.2, 240.22; 341/50; 348/581, 222.1
See application file for complete search history.

(56) References Cited

U.S. PATENT DOCUMENTS

| 6,094,510 | A  | * | 7/2000  | Yaguchi et al. | 382/232 |
| 6,504,494 | B1 | * | 1/2003  | Dyas et al.    | 341/50  |
| 6,829,016 | B2 | * | 12/2004 | Hung           | 348/581 |
| 6,993,073 | B2 | * | 1/2006  | Foong et al.   | 375/240.03 |
| 7,024,044 | B2 | * | 4/2006  | Bruna et al.   | 382/239 |
| 7,062,107 | B1 | * | 6/2006  | Crosby et al.  | 382/299 |
| 2005/0163218 | A1 | * | 7/2005 | Le Clerc et al. | 375/240.16 |

(Continued)

FOREIGN PATENT DOCUMENTS

JP    4-315370 A    11/1992

(Continued)

OTHER PUBLICATIONS

Japanese Office Action dated Oct. 15, 2007 issued in corresponding Application No. 2005-503210.

*Primary Examiner*—Amir Alavi
(74) *Attorney, Agent, or Firm*—Cohen Pontani Lieberman & Pavane LLP

(57) ABSTRACT

This device includes an image data creator that creates a first type of image data for test shooting and creating a second type of image data for real shooting; a compressor that compresses the image data in a predetermined compression format; and a processor; wherein the compressor has one or plural compression parameters relating to a compression rate; the creator newly supplies files of the first type to the compressor one after another; the compressor compresses at least two files among the continuously supplied first type using values of compression parameters; the processor decides the value of the compression parameter to be used for the second type according to a predetermined standard, based on two and more files of first type image data that are compressed using values of compression parameters; and the processor sets the value of the compression parameter of the compressor at the decided value.

27 Claims, 8 Drawing Sheets

U.S. PATENT DOCUMENTS

2006/0192860 A1* 8/2006 Atsumi et al. ........... 348/222.1

FOREIGN PATENT DOCUMENTS

| JP | 8-214258 A | 8/1996 |
| JP | 10-108134 A | 4/1998 |
| JP | 2000-114980 A | 4/2000 |
| JP | 2001-061148 | 3/2001 |
| JP | 2001-078192 | 3/2001 |
| JP | 2002-247517 A | 8/2002 |

* cited by examiner

DIGITAL PHOTOGRAPHIC DEVICE FOR CONTROLLING COMPRESSION PARAMETER OF IMAGE DATA AND METHOD OF DECIDING COMPRESSION PARAMETER VALUE OF IMAGE DATA

RELATED APPLICATION

This application is a U.S. Continuation Application under 35 USC 371 of International Application PCT/JP2003/008038 filed 25 Jun. 2003.

BACKGROUND OF THE INVENTION

1. Field of the Invention

The present invention relates to a function for optimally controlling a value of a compression parameter when compressing the image data that is photographed by a digital photographic device, and particularly, the present invention relates to the optimum method in the case of mounting a control function of the compression parameter value of such image data in a camera-equipped cellular phone and a camera-equipped PDA or the like and a digital photographic device that is provided with the structure for this method.

2. Description of the Related Art

In recent years, there are many occasions that a camera is incorporated in an electric device such as a personal computer, a PDA, and a cellular phone. These devices also can photograph a still image and a moving image as same as a digital camera that is a conventional specialized photographic machine. However, there is a function to estimate number of remaining images to be shot as a function that is mounted in the digital camera that is the specialized photographic machine but that has not mounted yet in a multi-function cellular phone, PDA, or the like such as a camera-equipped cellular phone.

The remaining shot number predicting function displays the number of images that can still be shot. According to a film camera, since a piece of film is consumed for each shooting, it is possible to clearly know the number of remaining images to be shot. However, according to a digital image pick-up apparatus which saves the photographs as data in a digital format, since it is normal that the portion of a data recording medium consumed by one shot is not fixed, the user cannot clearly know the number of images that can still be shot. If the user cannot know the number of remaining images, it is difficult for the user to form a shooting plan and it is a disadvantage for the user. Therefore, conventionally, in the digital camera that is the specialized photographic machine, a function that makes efforts to maintain a uniform consumption of the data recording by each shooting so as to make it possible to estimate the number of remaining images to be shot is mounted.

In order to easily estimate the number of remaining images, it is effective to make the data size of the image data file to be generated by each shooting uniform because the number of photographable images can still be shot can be calculated from the remaining capacity of the data recording medium if the data size of the image data file generated for each shot is regular. In the meantime, since more image data are saved in the data recording medium, the image data is normally compressed and then saved in the data recording medium. One or a plurality of parameters is involved in this compression and a parameter called a quality factor is a typical one in the compression of a JPEG format. The sizes of the data of images after compression using the same parameter value are different depending on the content of the photographed image. Accordingly, when all the image data are compressed by the same compression parameter, the size of the generated image data file is different for each shooting. Therefore, as described in JP-A-4-233373, in the conventional specialized photographic machine, the data of different images generated by shooting is compressed at different compression parameter values and when it is compressed into a desired data size, the compressed image data is saved so as to always maintain a set data size of the compression image data file to be generated. Accordingly, the parameter value of the compression parameter for use in the compression of the image data is slightly different for each shooting.

The structure of the hardware of the conventional specialized photographic machine and a method of deciding a parameter value of a compression parameter will be described with reference to FIG. 7. FIG. 7 typically shows a hardware structure of the conventional specialized photographic machine. A specialized photographic machine 130 is configured by a lens 132, a solid-state image pickup device 133, an A/D converter 134, a DSP 135 for the image processing, a CPU 136, a temporary storage unit 137, a main storage device 138, a display 139, and a user interface 140 such as a shutter button, and the exchange of a signal among these devices is carried out through a bus 131. If the shutter button of the user interface 140 is pressed down, the CPU 136 issues an order to start shooting, the light passed through the lens 132 is converted into an electric signal by the solid-state image pickup device 133, and this electric signal is digitalized by the A/D converter 134 to be temporally stored in the temporary storage unit 137. Here, all of the signals outputted from all pixels of the solid-state image pickup device are stored in the temporary storage unit 137 as the digital data. Next, the DSP 135 reads the output signal of the solid-state image pickup device 133 that is made into the digital data stored in the temporary storage unit 137 to create the image data for one photographed frame from the data. The image data is in a YUV format. The DSP 135 temporarily saves the created image data for one frame in the temporary storage unit 137 again.

Continuously, the DSP 135 reads the image data for one frame that was created previously from the temporary storage unit 137 and it JPEG-compresses this image data at a predetermined compression parameter value, and measures the data size after the compression. The compression format is normally JPEG. When the data size after compression is not a desired data size, the image data for one frame from the temporary storage unit 137 is read again, the compression parameter is changed, it is compressed again, and the DSP 135 measures the data size after compression. Then, repeating the above-described operation, the DSP 135 saves the image data that is compressed at a compression parameter value that the data size after compression becomes the desired data size in the main storage device 138.

However, trying to execute the above-described conventional method of controlling a parameter value of a compression parameter also in the conventional camera-equipped cellular phone, two disadvantages are generated. This will be described with reference to FIG. 8.

FIG. 8 typically shows a conventional camera-equipped cellular phone. A conventional camera-equipped cellular phone 150 is characterized in that it comprises a host module 152 handling functions such as telephone calling and scheduling and an interface 153 is located among the modules. The reason that a conventional camera-equipped cellular phone 150 in particular comprises two modules is that a general versatility is given to the camera module. If a camera part is made into an independent module, it is possible to combine the same camera module with various cellular phones and PDAs.

Such a camera module is obviously forced to be a compact size and cheap. However, if the conventional method of controlling a parameter value of a compression parameter used in the conventional specialized photographic machine is used, a DSP 135 with a high processing ability and a temporary storage unit 137 must be mounted in the camera module, and this makes the camera module a large size and expensive. Since the temporary storage unit 137 must save the image data configuring one frame, the higher the resolution of the image pickup device is, the more the size and the price of the camera module are increased.

Therefore, if the conventional method of controlling a parameter value of a compression parameter is mounted on a host module 152 without providing a compression function of the image data to a camera module 151, the other disadvantage is generated. In this case, at first, the bus width of an interface 153 should be widened so as to be capable of transferring the image data that is not compressed. In order to make the bus width broad, the number of the signal line for this should be increased and this increases the size and the price of the camera module. Accordingly, it is preferable that the image data is compressed by the camera module 151 and then transferred to the interface 153. In addition, it is preferable that the data processing amount is made as light as possible, because while the host module also has a temporary storage device and a CPU, the host module must perform various processing not done by the specialized photographic machine. Accordingly, a method to decide the parameter value of a compression parameter by exchanging the image data between the temporary storage unit and the CPU many times is not effective.

Thus, due to a problem with respect to the sizes and the prices of the camera module and the interface and the data processing capability, the conventional camera-equipped cellular phone and camera-equipped PDA or the like cannot make the data size of the image data file uniform by controlling the compression parameter value of the image data.

SUMMARY OF THE INVENTION

The object of the present invention is to provide a digital photographic device for controlling a parameter value of a compression parameter to be used for the compression of the image data without needing a large-size temporary storage unit, a broad bus width, or a high processing capability; and a method of deciding the parameter value of the compression parameter of the image data.

The first invention of the present application may provide a digital photographic device including: an image data creator that creates first type of image data for test shooting and creating second type of image data for real shooting; a compressor that compresses the image data in a predetermined compression format; and a processor that processes the data; wherein the compressor has one or plural compression parameters determining a compression rate; the image data creator newly supplies the first type of image data to the compressor one after another, newly performing the test shooting one after another; the compressor compresses at least two and more first type of image data among the continuously supplied first type of image data at values of the compression parameters which are different from each other; the processor decides the value of the compression parameter to be used for the second type of image data, based on two and more first type image data files that were compressed with different compression parameters, according to a predetermined standard; and further, the processor sets the value of the compression parameter of the compressor to be the above decided value.

In the digital photographic device, it is preferable that the first type of data has a lower resolution than that of the second type of image data. In addition, in the digital photographic device, any one of the one or plural compression parameters may be not only a one-dimensional matrix but also a second-dimensional matrix. Further, in the digital photographic device, it is preferable that the predetermined standard relates to a compression rate. In addition, in the digital photographic device, it is preferable that the predetermined standard relates to a compression rate estimation table to estimate the difference between the compression rate in the test shooting image data and the compression rate of the image data for saving, caused chiefly by the difference of the resolution of these two images.

Further, the digital photographic device is provided with a display unit and it is preferable that the digital photographic device is configured in such a manner that the processor displays the first type of image data that is not compressed by the compressor on the display unit. In addition, the digital photographic device is provided with a main storage unit to store the data and it is preferable that the digital photographic device is configured in such a manner that the data creator supplies the second type of image data to the compressor for the real shooting; the compressor compresses the second type of image data to be supplied with the decided value of the parameter; and the processor saves the compressed second type of image data in the main storage unit. Further, in the digital photographic device, it is preferable that the predetermined compression system is a JPEG format. In addition, in the digital photographic device, it is preferable that the one or plural compression parameters include a quantization table or a quality factor.

Further, the second invention of the present application may provide a digital photographic device including: a camera module including an image data creator that creates a first type of image data for test shooting and second type of image data having a higher resolution than that of the first type of image data for real shooting, a compressor that compresses the image data at a predetermined compression format, a data output part for transmitting the data to the outside, and a control signal input part for receiving a control signal; and a host module including a processor that processes the data, a data input part for receiving the data, and a control signal output part for transmitting a control signal to the camera module; wherein the compressor has one or plural compression parameters relating to a compression rate, the camera module newly supplies the first type of image data to the compressor one after another, newly performs the test shooting one after another with the image data creator; compresses at least two files of the first type of image data from the repeatedly supplied first type of image data, each with different compression parameters, with the compressor; and transmits the compressed first type of image data to the host module through the data output part one after another; and the host module receives the compressed first type of image data through the data input part one after another, decides with the processor the value of the compression parameter to be used for the second type of image data according to a predetermined standard, based on the two or more first-type image data files that are compressed with values of the compression parameters which are different from each other; and further, transmits a control signal through the control signal output part which has the processor set the value of the compression parameter of the compressor at the value decided.

In the digital photographic device according to the second invention, any one of the one or plural compression parameters may be a matrix. In addition, in the digital photographic device according to the second invention, it is preferable that the predetermined standard relates to a compression rate.

Further, in the digital photographic device according to the second invention, it is preferable that the host module is provided with a display unit and a main storage unit for storing the data; the camera module transmits the first type of image data that is not compressed by the compressor to the host module through the data output part one after another; the host module receives the first type of image data that is not compressed through the data input part one after another and displays the first type of image data that is not compressed by the compressor on the display unit; further, the camera module supplies the second type of image data to the compressor for the real shooting by the image data creator; compresses the supplied second type of image data with the compressor, using the decided value of the compression parameter; and transmits the compressed second type of image data to the host module through the data output part; and the host module receives the compressed second type of image data through the data input part and saves the compressed second type of image data in the main storage unit by the processor.

Further, the third invention of the present application may provide a digital photographic device including: a camera module including an image data creator that creates a first type of image data for test shooting and a second type of image data having a higher resolution than that of the first type of image data for real shooting, a first compressor that compresses the image data in a predetermined compression format, a data output part for transmitting the data to the outside, and a control signal input part for receiving a control signal; and a host module including a processor that processes the data, a data input part for receiving the data, and a control signal output part for transmitting a control signal to the camera module; wherein the host module is provided with a second compressor; the compressor has one or plural compression parameters relating to a compression rate; the camera module newly creates the first type of image data one after another, the image data creator newly performing the test shooting one after another, and transmits the continuously created first type of image data to the host module through the data output part one after another; the host module receives the created first type of image data through the data input part one after another; compresses at least two and more files of the first type image data among the continuously received first type image data using the values of compression parameters which are different from each other, with the second compressor; decides with the processor the value of the compression parameter to be used for the second type of image data according to a predetermined standard, based on the two and more files of first type image data that are compressed using the values of the compression parameters which are different from each other; and further, transmits a control signal through the control signal output part in order to set the value of the compression parameter of the first compressor at the value decided by the processor.

In the digital photographic device according to the third invention of the present application, any one of the one or plural compression parameters may be a matrix. In addition, in the digital photographic device according to the third invention of the present application, it is preferable that the predetermined standard relates to a compression rate. Further, in the digital photographic device according to the third invention of the present application, it is preferable that the second compressor is realized by the same hardware as that of the processor.

Further, in the digital photographic device according to the third invention of the present application, it is preferable that the host module is provided with a display unit and a main storage unit for storing the data and displays on the display unit, from among the continuously received first type of image data, that which is not compressed by the compressor; further, the camera module supplies the second type of image data for the real shooting generated by the image data creator to the first compressor; compresses the second type of image data to be supplied, using the decided value of the compression parameter, with the first compressor; and transmits the compressed second type of image data to the host module through the data output part; and the host module receives the compressed second type of image data through the data input part and saves the compressed second type of image data in the main storage unit by the processor.

In addition, the fourth invention of the present application may provide a digital photographic device including: a camera module including an image data creator that creates a first type of image data for test shooting and second type of image data for real shooting, having a higher resolution than that of the first type of image data, a compressor that compresses the image data in a predetermined compression format, and a data output part for transmitting the data to the outside; and a host module including a first processor that processes the data and a data input part for receiving the data; wherein the camera module is provided with a second processor that processes the data; the compressor has one or plural compression parameters relating to a compression rate; the camera module newly supplies the first type of image data to the compressor one after another upon new test shooting one after another by the image data creator; compresses with the compressor at least two files from among the continuously supplied first type of image data, using values of the compression parameters which are different from each other; decides with the second processor the value of the compression parameter to be used for the second type of image data according to a predetermined standard based on the two and more files of the first type of image data that are compressed using values of the compression parameters which are different from each other; and further, sets the value of the compression parameter of the compressor to be the value decided by the second processor.

Further, in the digital photographic device according to the fourth invention of the present application, any one of the one or plural compression parameters may be a matrix. In addition, in the digital photographic device according to the fourth invention of the present application, it is preferable that the. predetermined standard relates to a compression rate.

Further, in the digital photographic device according to the fourth invention of the present application, it is preferable that the host module is provided with a display unit and a main storage unit for storing the data; the camera module transmits the first type of image data that is not compressed by the compressor to the host module through the data output part one after another; the host module receives the first type of image data that is not compressed through the data input part one after another and displays the first type of image data that is not compressed by the first compressor on the display unit; further, the camera module supplies the second type of image data for the real shooting which is created by the image data creator to the compressor; compresses the second type of image data to be supplied using the value of the compression parameter decided by the compressor; and transmits the compressed second type of image data to the host module through the data output part; and the host module receives the second type of image data compressed by the first processor through the data input part and saves the compressed second type of image data in the main storage unit.

In addition, the fifth invention of the present application may provide a method of deciding a value of a compression parameter in the case of compressing second type image data in a digital photographic device, which creates first type of image data for test shooting; creates the second type of image data for real shooting; compresses the created second type of image data; and saves the compressed second type of image data; including: newly creating the first type of image data one after another by newly performing the test shooting one after another; compressing at least two and more files from among the continuously created first type of image data, using the values of compression parameters which are different from each other; and deciding the value of the compression parameter to be used for the second type of image data according to a predetermined standard, based on two and more files of first type image data that are compressed using values of the compression parameters which are different from each other.

Further, in the method to decide the parameter value of a compression parameter, it is preferable that the first type of image data has a lower resolution than that of the second type of image data. In addition, in the method to decide a parameter value of a compression parameter, it is preferable that the digital photographic device has the plural compression parameters that are different from each other. Further, in the method of deciding a value of a compression parameter, any one of the one or plural compression parameters may be a matrix. In addition, in the method of deciding a value of a compression parameter, the predetermined standard may relate to a compression rate.

DETAILED DESCRIPTION OF THE INVENTION

Hereinafter, an embodiment that the present invention is applied to a camera-equipped cellular phone will be described below with reference to the drawings.

EMBODIMENT 1

Figure 1:
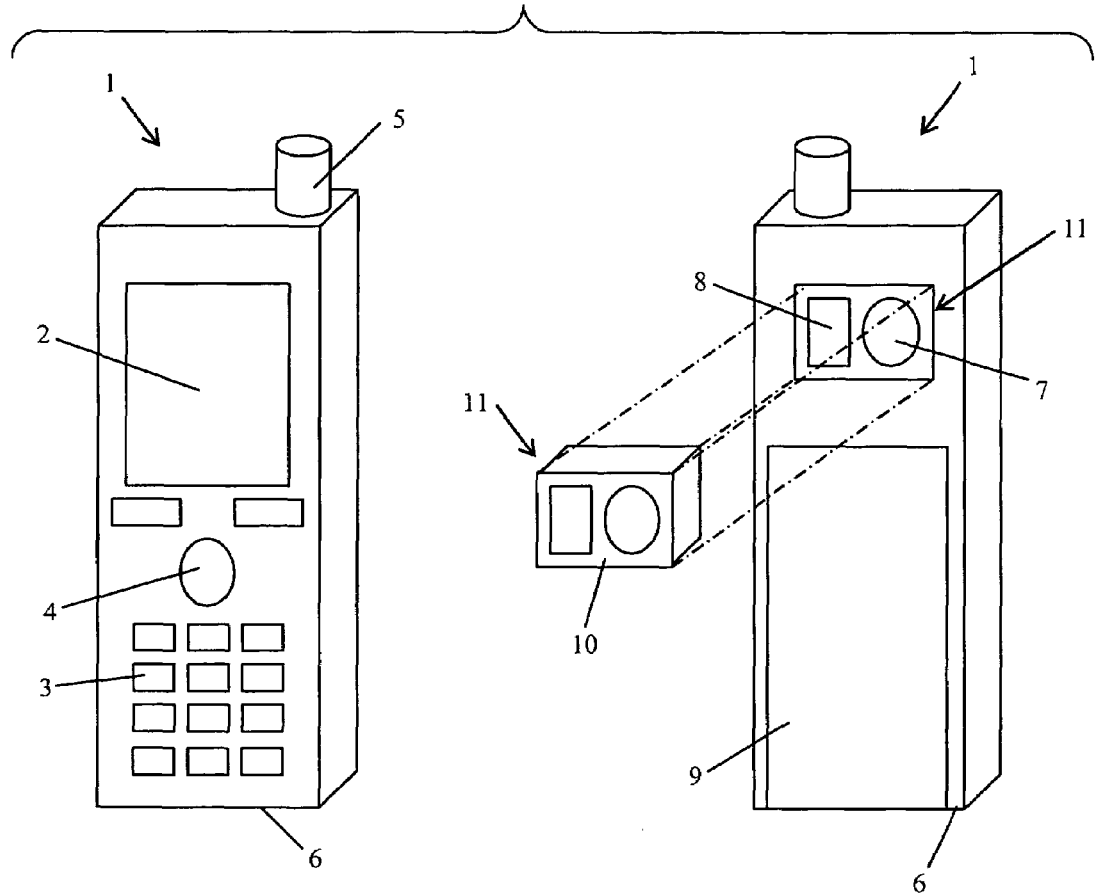
FIG. 1 is an external view of a camera-equipped cellular phone to which the present invention is applied.

FIG. 1 is an external view of a camera-equipped cellular phone to which the present invention is applied. A camera-equipped cellular phone 1 is provided with a display 2, a numeric keypad 3, a function button 4, and an antenna 5 or the like on its front surface; the camera-equipped cellular phone 1 is provided with a camera portion 11 and a battery cover 9 or the like on its rear surface; and further, the camera-equipped cellular phone 1 is provided with a chassis 6 for integrally holding these parts. As well known, the size and the weight of the camera-equipped cellular phone 1 are very small, so that it is not inconvenient to hold the camera-equipped cellular phone 1 by one hand or to carry it in the handbag. The camera portion 11 comprises a camera module provided with a lens 7, an LED light 8, and an independent chassis 10. The camera portion is here made an independent module because a general versatility is given to the camera module so as to be easily combined with other cellular phone models and PDAs. As a result, the camera-equipped cellular phone 1 can be divided into the camera module 11 and the remaining portion (a host module).

The function button 4 is used a shutter button or the like upon sending and receiving the telephone call and upon taking a picture. In the case of making a call by using the camera-equipped cellular phone 1, a user may input a telephone number from the numeric keypad 3 and press the functional button 4. In addition, in the case of taking a picture, the user may have the camera-equipped cellular phone 1 with the lens 7 directed to the target and may check a preview image that is photographed by the camera module 11 on the display 2. Therefore, if the user presses the function button 4, the shooting is carried out and the image data created by the shooting is saved in a recording part provided in the camera-equipped cellular phone 1.

Figure 2:
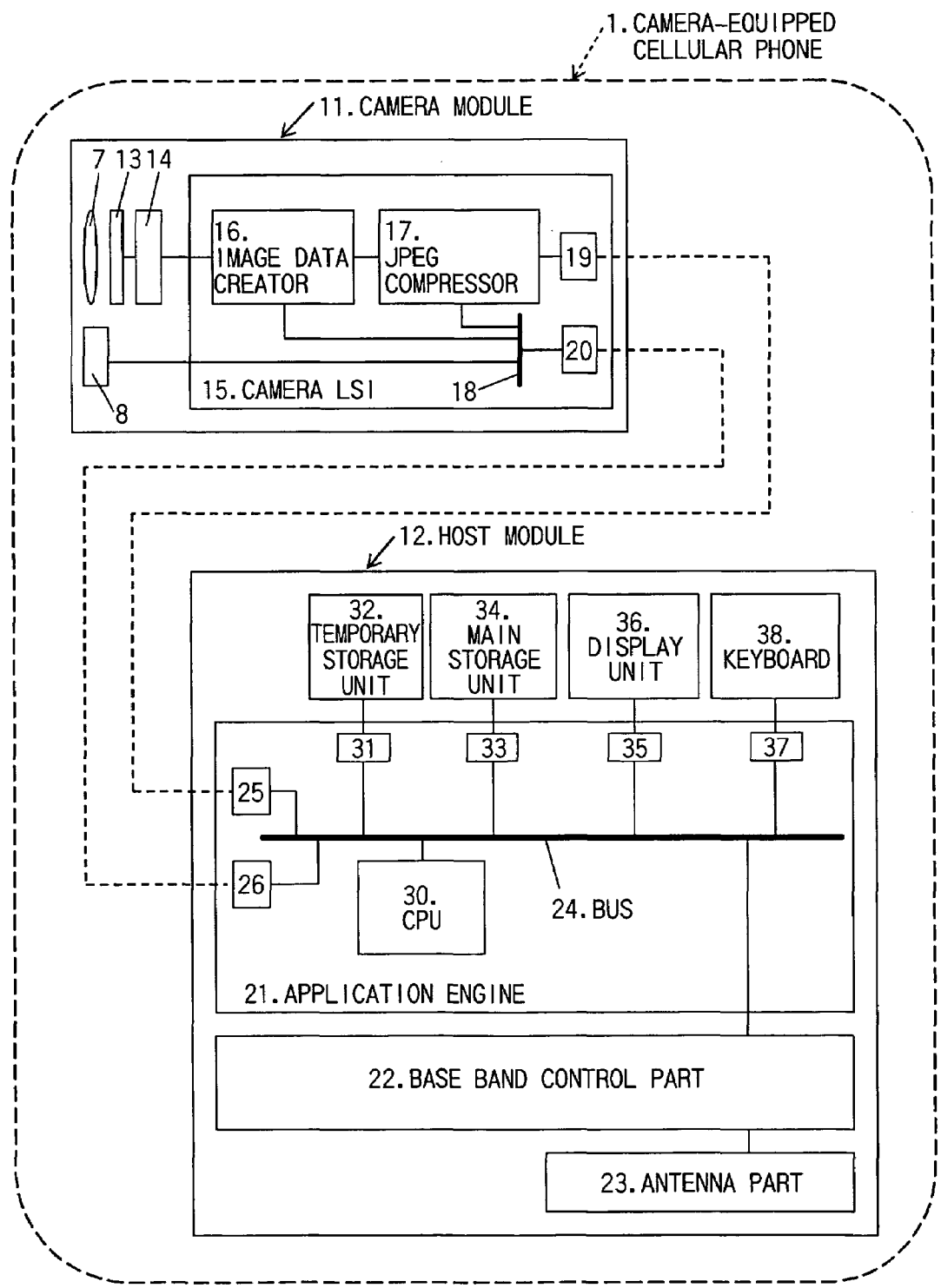
FIG. 2 is a block diagram of hardware of the camera-equipped cellular phone to which the present invention is applied.

With reference to FIG. 2, the configuration and the operation of the hardware of the camera-equipped cellular phone to which the present invention is applied will be described below. As described above, the camera-equipped cellular phone 1 comprises the camera module 1 and a host module 12, the camera module 11 may handle the shooting and creation of the image data, and the host module 12 may handle the PDA functions such as the telephone function and the scheduling, as well as saving and display of the created image data.

The camera module 11 is provided with the lens 7, the LED light 8, a solid-state image pickup device 13, an A/D converter 14, an image data creator 16, a JPEG compressor 17, a bus 18, a data interface 19, and a control interface 20 and the like. Among these devices, the image data creator 16, the JPEG compressor 17, the bus 18, the data interface 19, and the control interface 20 are provided in one chip as a camera LSI 116.

As the solid-state image pickup device, for example, a CCD and a CMOS sensor or the like can be used. The solid-state image pickup device 13 may carry out the shooting by converting the light passed through the lens 7 into an electric signal. The output signal of the solid-state image pickup device 13 is converted into the digital data by the A/D converter 14. This digital data, called RAW data, is not yet image data which can be displayed by a computer or printed by a printer. The image data is created by the image data creator 16. First, the image data creator 16 performs initial image processing on the RAW data such as a lens shading correction and a white balance or the like. Next, extracting the components such as red (R), green (G), and blue (B) from the RAW data to which the original image processing is applied and applying the CFA (Color Filter Array) interpolation processing, the image data of an RGB formation composed of an RGB 3 plane is created. Further, with respect to this image data, the processing such as intensification of the outline and a gamma correction or the like is carried out. Finally, the format of the image data is converted from the RGB format into a YUV format. The image data composing one frame is created one line or several lines at a time and outputted to the JPEG compressor 17 as it is created. Finally, from the output signal of the solid-state image pickup device 13 acquired by the one shooting, the image data of one entire frame are created.

The camera-equipped cellular phone 1 is provided with a photograph mode and a preview mode. The photograph mode is a mode to acquire the image data used as a photograph, namely, the so-called picture taking mode. In the photograph mode, the camera module 11 may create the image data at the maximum resolution that is photographable by the solid-state image pickup device 13. In addition, in order to save the capacity of a main storage unit 34 to be described later, sometimes shooting is carried out with the resolution decreased to half of the maximum resolution of the solid-state image pickup device 13 or ¼ thereof. The image data created in the photograph mode is saved in the data recording medium in order to use this image data afterward. Hereinafter, this image data is called the image data for saving. The preview mode is a mode to check the image to be photographed, using the display 2 for the purpose of deciding the structural outline of the actual photograph. In the preview mode, the image data with the resolution greatly decreased in comparison with the image data to be created in the photograph mode. This image data is used by a display unit 36 that is provided in the host module 12 and it is mainly used for displaying the preview, so that this image data is hereinafter called as the image data for display. Since the display unit 36 only has a small display screen, the resolution of the image data for display may also be small and typically, the resolution is about QQVGA (160 pixels×120 lines). In the preview mode, not by acquiring the output signal from the all pixels of the solid-state image pickup device 13 but by acquiring the output signal only from partial pixels, the image data for display with a small resolution is created. In order to create the image data for display, there are well-known methods such as the above-described CFA interpolation processing.

Figure 3:
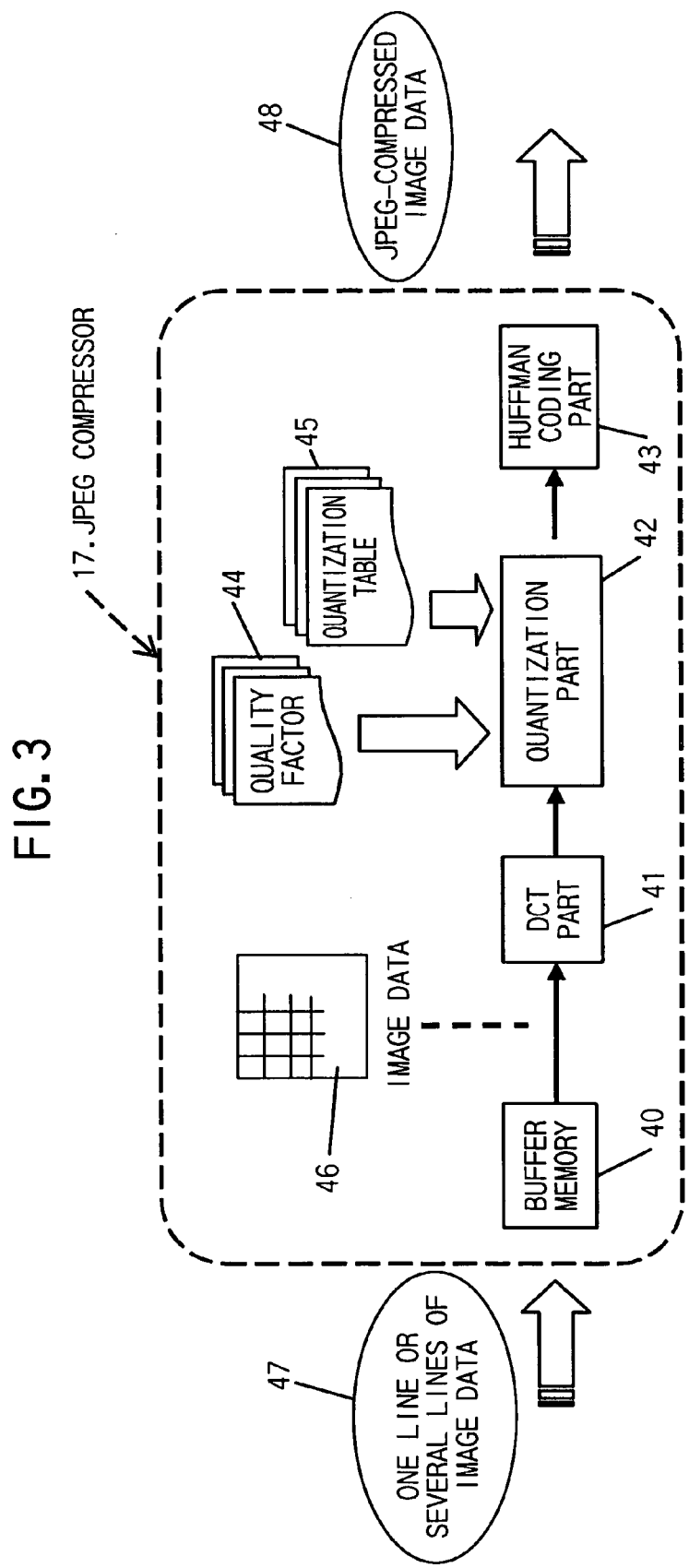
FIG. 3 is a detailed view of a JPEG compression part of the camera-equipped cellular phone to which the present invention is applied.

With reference to FIG. 3, the structure and the operation of the JPEG compressor 17 will be described below. The JPEG compressor 17 is provided with a buffer memory 40, a DCT part 41, a quantization part 42, and a Huffman coding part 43. This buffer memory 30 may store plural lines, for example 8 lines, of the image data 47 sequentially constructed by an image construction part 16 one line or several lines at a time. The DCT part 41 may apply a discrete cosine transformation to each data block 46 composed of 8×8 units of the image data 47 from the eight lines stored in the buffer memory, and may convert this data into the information of a frequency domain. The quantization part 42 may smooth the data block that has been converted into the frequency information. The quantity of data used for smoothing may be that of a quality factor 44 or a quantization table 45. The quantization table 45 is a quantization matrix of 8×8 and it is divided by the block converted into the frequency information. The quality factor 44 is a coefficient and by multiplying this with the quantization table 45, each element of the quantization table 45 is increased or decreased at the same rate. Depending on a degree of this smoothing in the quantization part 42, the compression rate is changed. Accordingly, by using the different quality factor 44 or the different quantization table 45, the compression rate can be changed. According to the camera-equipped cellular phone of the present invention, the host module 12 can, by controlling the quantization part 42 through the control interface 20, change the quality factor 44 and the quantization table 45. The Huffman coding part 43 may perform compression by converting the data block, which is a two-dimensional data row of 8×8, into a one-dimensional data row by zigzag scan and allocating a short code to a bit pattern with a high frequency of appearance. Thus, the JPEG-compressed image data 48 is sequentially created for each data block.

In this way, since the JPEG compressor 17 according to the present embodiment sequentially compresses the image data every time the image data of eight lines is created by the image data creator 16, the JPEG compressor 17 does not need a buffer memory that temporarily saves the entire image data of one piece and it only needs the buffer memory for saving the image data of eight lines. Obviously, the embodiment that the number of lines to be stored in the buffer memory 40 is increased or deceased to 16 lines or 32 lines is also available. In addition, since the compression data 48 created by the JPEG compressor 17 is continuously outputted to the host module 12 as it is generated through the data interface 19, a buffer memory that temporarily saves the entire image data of one shot is not needed.

In addition, the JPEG compressor 17 can select whether to carry out the compression processing. This selection is carried out when the CPU 30 of the host module 12 controls the JPEG compressor 17 through the control interface 20. In the case that the compression processing is not carried out, the JPEG compressor 17 outputs the image data transmitted from the image data creator 16 to the host module 12 through the data interface 19 without performing any processing.

Returning to FIG. 2, the hardware structure and the operation of the host module 12 will be described below. The host module 12 comprises a data interface 25, a control interface 26, the CPU 30, a bus 24, the interface for a temporary storage unit 31, a temporary storage unit 32, a interface for a main storage unit 33, the main storage unit 34, the interface for a display unit 35, the display unit 36, an interface for a keyboard 37, a keyboard 38 or the like, a base band control part 22, and an antenna part 23 or the like. Among these devices, the CPU 30, the bus 24, and the interfaces 25, 26, 31, 33, 35, and 37 are provided in one chip as the application engine 21. The base band control part 22 handles the function for sending and receiving of the telephone call and has the specialized CPU. The application engine 21 may handle the function other than that for sending and receiving of the telephone call and may also handle the function of control of the keyboard 38, a game, reproduction of music, and preparing a schedule or the like in addition to the processing of the image data transmitted from the camera module 11. In the meantime, the keyboard 38 may include the data keys 3 and the functional button 4 or the like.

The image data outputted from the camera module 11 or the compressed image data are inputted in the host module 12 through the data interface 25 and then, it is temporarily saved in the temporary storage unit 32. A typical storage unit used as the temporary storage unit 32 is a SDRAM.

In the preview mode, the camera module 11 may newly collect the data by the solid-state image pickup device 13 at predetermined time intervals, for example each 1/10 second, to create new image data for display from this data. Accordingly, in this example, the image data for display of a new frame is created for each 1/10 second. When the image data for display that is not compressed is inputted in the host module 12, the CPU 30 may read this image data for saving from the temporary storage unit 32 and may display it on the display screen of the display unit 36 by carrying out predetermined processing.

In addition, the CPU 30 may issue the order to the JPEG compressor 17 of the camera module 11 through the control interfaces 26 and 20 and the CPU 30 may control the JPEG compressor 17 so as to compress one file of the image data for display every time the predetermined amount of the image data for display is created. As a result, for example, if three files of the image data for display are created, one file among these is compressed by the JPEG compressor 17. In this case, the CPU 30 may control the JPEG compressor 17 so as to compress the image data for display by using a different quality factor 44 or a different quantization table 45 every time the image data for display of a new frame is compressed. In this way, a plurality of image data for display respectively compressed by different compressing parameters is created. Then, the CPU 30 reads the data from the temporary storage unit 32, measures the data size, and stores the quality factor 44 and the quantization table 45 used for compression every time the compressed image data for display is inputted to the CPU through the data interface 25. When the size of the data is completely measured, the compressed image data for display is discarded and the quality factor and the quantization table used for the compression and the measured data size are temporarily stored in the temporary storage unit 32. Thus, the CPU 30 measures the data size after each compression using different quality factors and different quantization tables, may compare these combinations, and decides on the compression parameter, namely, the quality factor and the quantization table to attain the desired data size. The CPU 30 can decide the quality factor and the QW to attain the desired data size from the following equation using data size S1 resulting from using a certain quality factor Q1 and data size S2 from using Q2.

$$QW = Q1 + (Q1 - Q2)/(S1 - S2) \times (SW - S1) \qquad \text{equation 1}$$

Here, the SW is the desired data size. The compression rate is defined by (SW/the data size of the image before compression).

In the photograph mode, the CPU 30 may control the JPEG compressor 17 so as to compress the image data for saving by using the quality factor and the quantization table to attain the desired data size decided in the preview mode. In other words, the CPU 30 may decide the compression rate of the image data for use for the photographing by deciding the quality factor and the quantization table used for photographing. This compression rate of the image data used for photographing is called the compression rate for saving. The camera module 11 in photographing may create the image data for saving and may compress this data by using the previously decided quality factor and quantization table. The compressed image data for saving is inputted in the host module 12 through the data interface 25 to be saved in the temporary storage unit 32 temporarily. The CPU 30 may read the compressed image data for saving from the temporary storage unit 32 and may save it in the main storage unit 34. The main storage unit 34 is provided with a recording medium that continuously stores the data even when the power source of the camera-equipped cellular phone 1 is turned off. For example, the flash memory, the CF card, and the SD card can be used. In the meantime, according to the above-described description, both of the quality factor 44 and the quantization table 45 of the JPEG compressor 17 are controlled, however, depending on the embodiment, it may be that either the quality factor 44 or the quantization table 45 only is controlled.

In the meantime, not the compressed image data for display but rather the uncompressed image data for display is displayed on the display unit 36, so that the user of the camera-equipped cellular phone 1 can check the image on the display screen even if the camera-equipped cellular phone 1 is performing the estimation processing of the parameter value of the compression parameter. In addition, according to the present embodiment, since the compression processing is carried out with respect to the image for display with a lower resolution than that of the image data for saving, it is possible to suppress the amount of processing done by the JPEG compressor 17.

Other than this, the CPU 30 not only can control the JPEG compressor 17 of the camera module 11 through the control interfaces 26, 20 and the bus 18 but also can control each processing in the image data image data creator 16, can turn on and off the LED light 8, can change the data collection mode of the solid-state image pickup device, and further, can control the parameter of the A/D converter 14 or the like.

Figure 4:
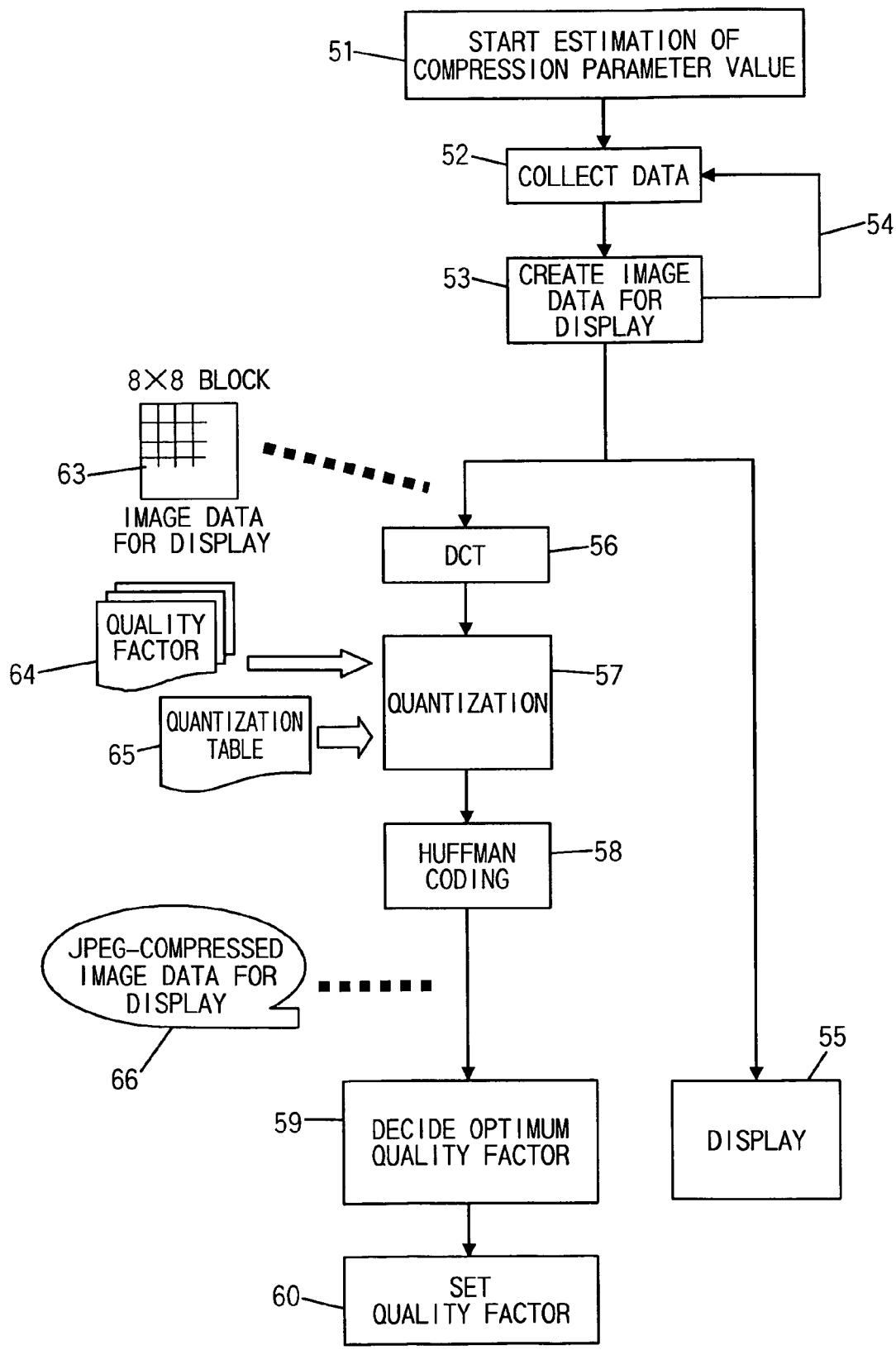
FIG. 4 is a flow chart with respect to decision of a compression parameter value for saving according to the present invention.

Next, with reference to FIG. 4, a flow of the processing in order to decide the value of the compression parameter for use in the compression of the image data for saving will be described below. At first, in step 51, the estimation of the compression parameter value will be started. The preview mode to create and display the image data for display may be started before the estimation of the parameter value is started. The estimation of the parameter value is started, for example, by pressing the function button 4 halfway. In step 52, in order to create the image data for preview, the data collection due to the solid-state image pickup device 13, namely, the conversion into an optical electric signal due to the solid-state image pickup device 13, is carried out. In step 53, the image data for display is created from the output signal of the solid-state image pickup device 13. The image data for display composing one frame is sequentially created one line or several lines at a time. The steps of the sequence of operations from the conversion into the optical electric signal due to the solid-state image pickup device 13 until creation of the image data for display are carried out at predetermined time intervals, for example, each 1/10 second (step 54). Every time the step 52 and the step 53 are repeated, the image data for display of one frame is created. Sometimes the created image data for display is compressed after that, and other times the created image data for display is not compressed after that. For example, every time three files of image data for display are created, one file among them is compressed. In step 55, the uncompressed image data for display is displayed on the display unit. In steps 56 to 58, one file among them is JPEG-compressed. At first, in the step 56, the discrete cosine transformation is performed for each data block 63 composed of 8×8 image data, and the data describing brightness and color is converted into the data of the frequency band. Next, in the step 57, quantization is performed and the data block 63 converted into the frequency information is smoothed by the quality factor 64 and the quantization table 65. Every time the image data for display of a new frame reaches the step 57, a different quality factor 64 or a different quantization table 65 are used. In other words, every time the image data for display of a new frame reaches the steps 56 to 58, this image data is compressed at different compression rates. In this example, the description is provided assuming that the quantization table 65 is fixed and the quality factor 64 only is changed. In the last step 58 of the compression process, the Huffman coding is carried out and the JPEG compression is completed. In the step 59, the sizes of the display data files resulting from the use of the different quality factors are compared with each other with and the quality factor which gives the desired data size is decided upon. In step 60, the compressor is set at the estimated quality factor.

Here, since the estimated compression parameter is acquired by compressing image data for display with a low resolution, sometimes it is not proper to use the estimated parameter as it is for the image data for photographing with a high resolution. It is known that the image with the higher resolution is generally compressed more effectively in the case of using the same compression parameter. Accordingly, sometimes it is preferable that a parameter QW' which gives a compression rate higher than the quality factor QW estimated as the equation 1 is used. In addition, the smaller the value of the quality factor, the lower the image quality and thus the higher the compression rate. Therefore, QW'=QW×S (S<1.0) may be decided on the basis of the difference of the resolution between the display image and the photographed image and judgment gained from experience. In the step 59, by using a compression rate estimation table indicating a relation between such a correction amount S and a corrected quality factor, a desired quality factor may be decided. An example of the compression rate estimation table is indicated in Table 1 as follows.

TABLE 1

Compression rate estimation table

| Value of quality factor | Correction Quantity | Quality factor after correction |
|---|---|---|
| th1 < = QW < th2 | s1 | QQW = s1 × QW |
| th2 < = QW < th3 | s2 | QQW = s2 × QW |
| th3 < = QW < th4 | s3 | QQW = s3 × QW |

QW is a quality factor estimated by the equation 1.
QQW is a quality factor after correction.
s1, s2, and s3 are quantities determined by the experiment.
th1, th2, the3, and th4 are threshold values determined by the experiment.
(Example 1) s1 = s2 = s3 = 0.75
(Example 2) s1 = 0.8, s2 = 0.75, s3 = 0.7

Figure 5:
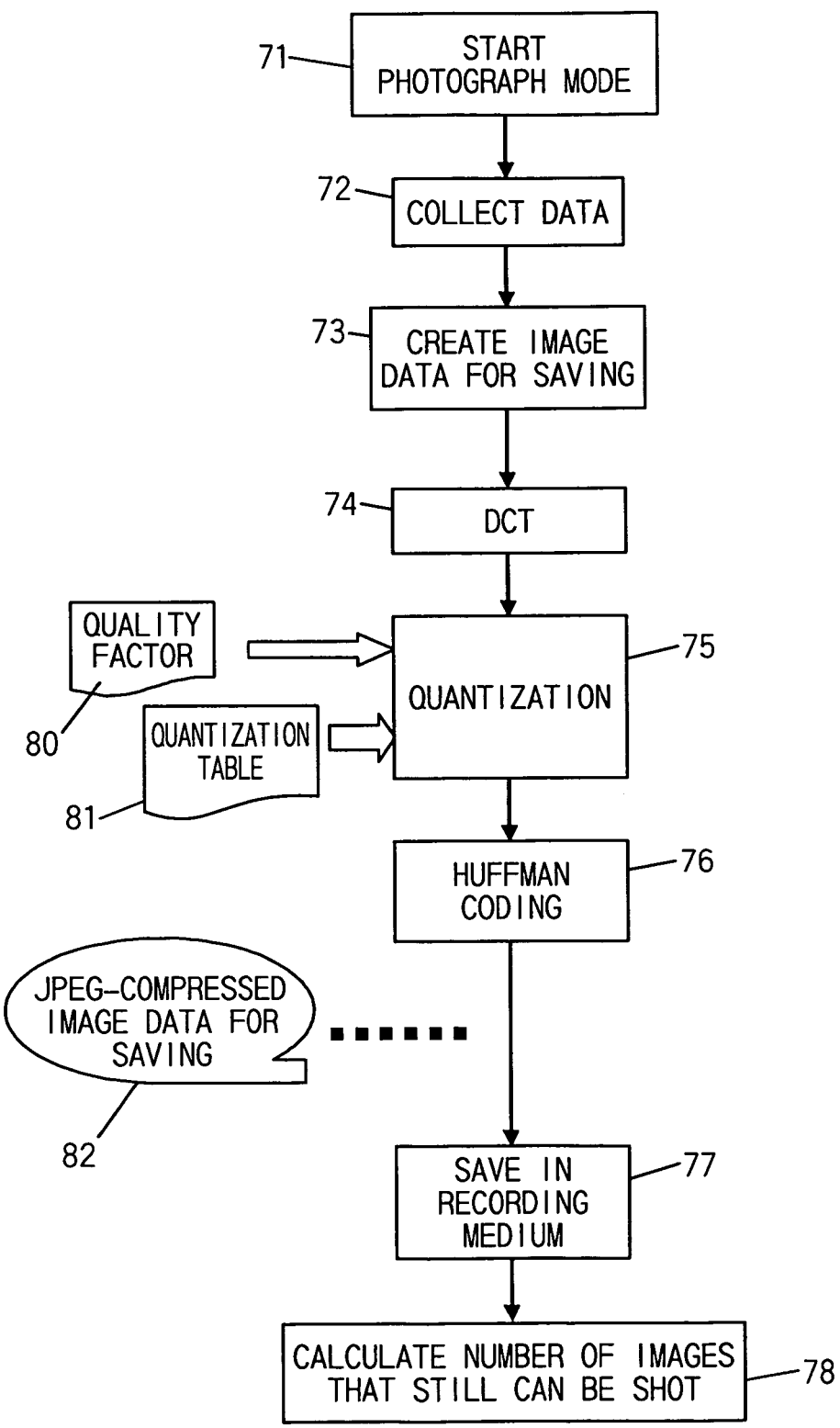
FIG. 5 is a flow chart of photograph mode according to the present invention.

Next, with reference to FIG. 5, the flow of the processing in the photograph mode of the digital photographic device according to the present invention will be described below. At first, in step 71, the photograph mode is started. The photograph mode is started, for example, by completely pressing the functional button 4 in FIG. 1. In step 72, the data collection due to the solid-state image pickup device 13 is carried out and the conversion into the optical electric signal is performed by the solid-state image pickup device 13. In step 73, the image data for saving is sequentially created one line or several lines at a time. In step 74, the discrete cosine transformation is performed for each data block composed of the image data of 8×8 and the data describing brightness and a color is converted into the data of the frequency band. Next, in step 75, quantization is performed using the quality factor 80 the quantization table 81 decided by the flow of the processing shown in FIG. 4.

In step 76, the Huffman coding is carried out and the JPEG-compressed image data for saving is sequentially created for each data block composed of the image data of 8×8. In step 77, the compressed image data for saving is saved in the recording medium. At last, in step 78, the calculation and the display of the number of images which still can be shot are carried out based on the remaining capacity of the recording medium and the data size per image data (one frame).

EMBODIMENT 2

According to the embodiment 1, the camera-equipped cellular phone 1 compresses the image data for display in the preview mode by using the JPEG compressor 17 of the camera module 11. However, when the processing capability of the host module 12 is abundant, it is also possible to compress the image data for display in the preview mode with the host module 12. Such an embodiment will be described with reference to FIG. 2.

In the preview mode, the camera module 11 may take a picture at predetermined time intervals to create the image data for display. Since the operation of the camera module 11 is the same as the embodiment 1 except when the compression is not performed, the explanation thereof is herein omitted. In the host module 12, the image data for display of a new frame is inputted through the data interface 25. The inputted image data for display is temporarily saved in the temporary storage unit 32. The CPU 30 may compress one file of the image data for display every time a predetermined amount of the image data for display is inputted. For example, if the three files of image data for display are inputted, one file of the image data for display among them is JPEG-compressed. The uncompressed image data for display is displayed by the display unit 36. With respect to the image data for display to be compressed, the CPU 30 may perform the compression processing such as the discrete cosine transformation, the quantization, and the Huffman coding. In other words, the compression processing is carried out by the software processing using the CPU 30.

Also according to the present embodiment, every time the image data for display of a new frame is compressed, a different quality factor or a different quantization table are used. In this way, the CPU 30 may measure the data size after compressing in each case and may decide the quality factor and the quantization table to attain the desired data size.

In the photograph mode, the CPU 30 may control the JPEG compressor 17 of the camera module 11 so as to compress the image data for saving by using the quality factor and the quantization table to attain the desired data size, decided by operation in the preview mode.

In the photograph mode, as same as the embodiment 1, the JPEG compressor 17 of the camera module 11 compresses the image data for saving. In this case, the CPU 30 of the host module 20 does not compress the data because the data interfaces 19 and 25 must be provided with broad bus width in order to transfer uncompressed image data for saving, and this leads to increase of the cost. In addition, the temporary storage unit 32 also must be made larger and this also leads to increase of the cost.

Embodiment 3

According to the embodiment 1, in the camera-equipped cellular phone 1, the CPU 30 of the host module 12 decides the parameter value of the compression parameter to be used for the compression of the image data for saving in the previous mode. However, in the case that the camera module is provided with an independent CPU, the parameter value can be decided in the camera module. Such an embodiment will be described below with reference to FIG. 6.

Figure 6:
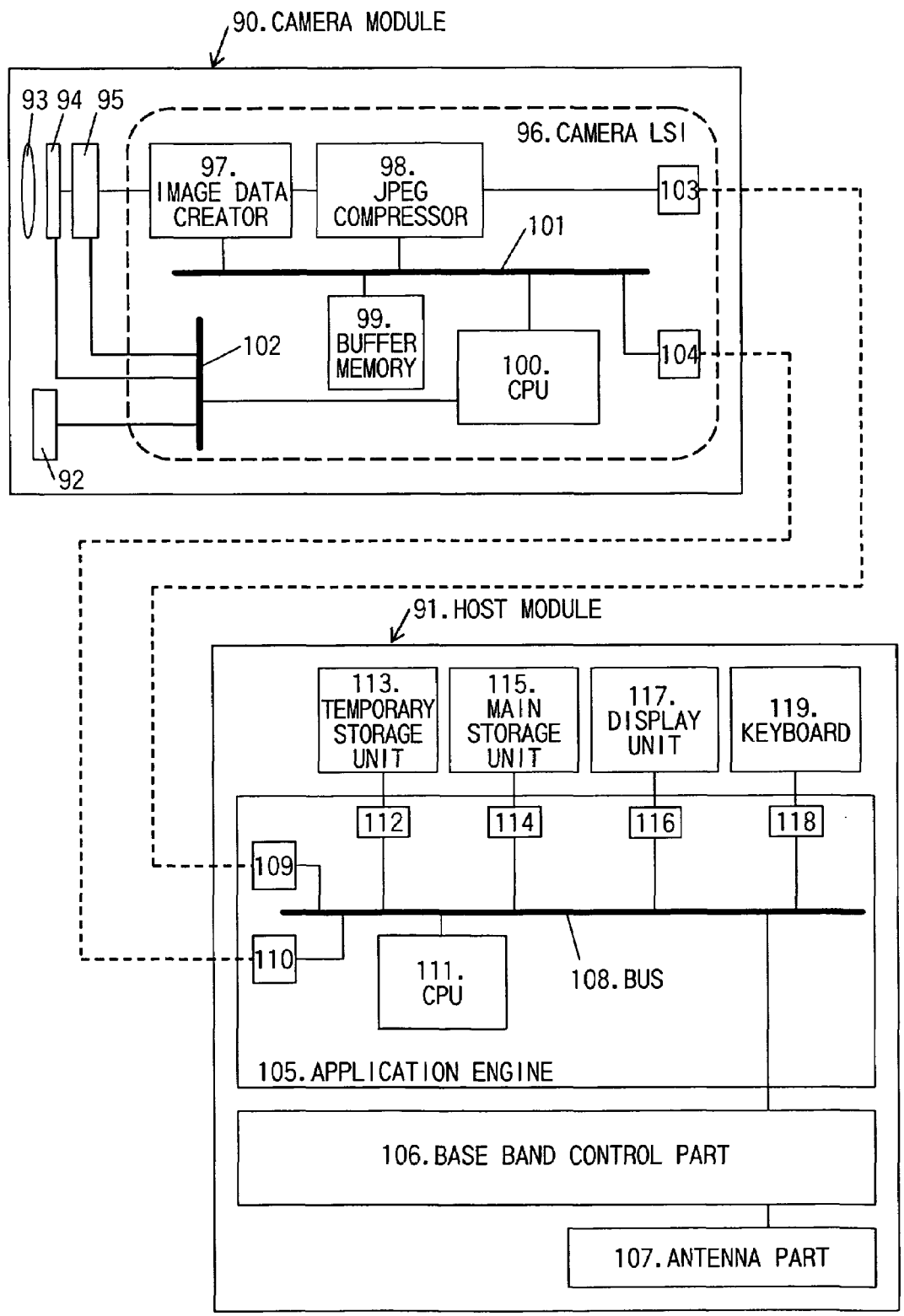
FIG. 6 is the other embodiment of the present invention.
Figure 7:
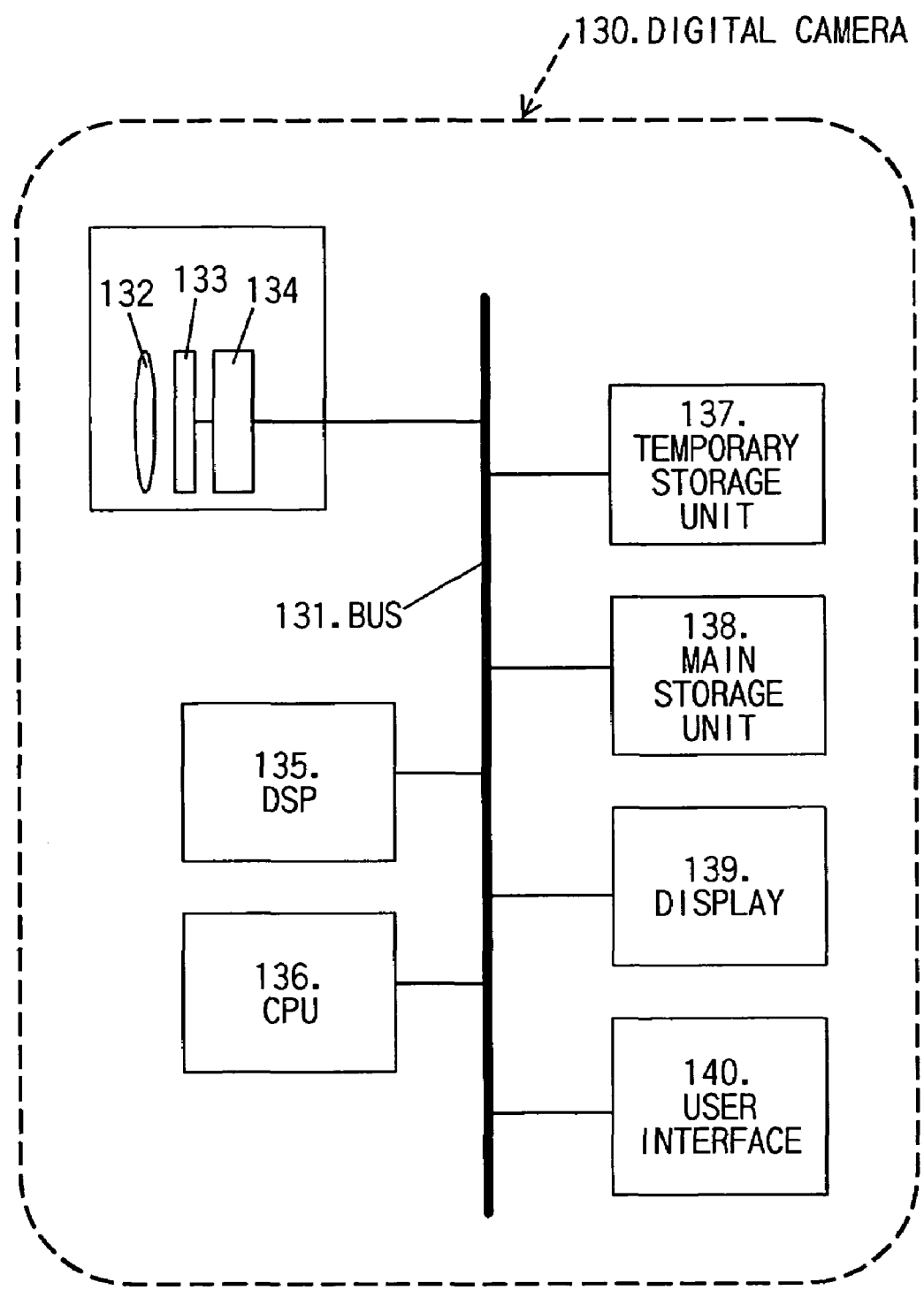
FIG. 7 is a block diagram of hardware of a conventional specialized photographic machine.
Figure 8:
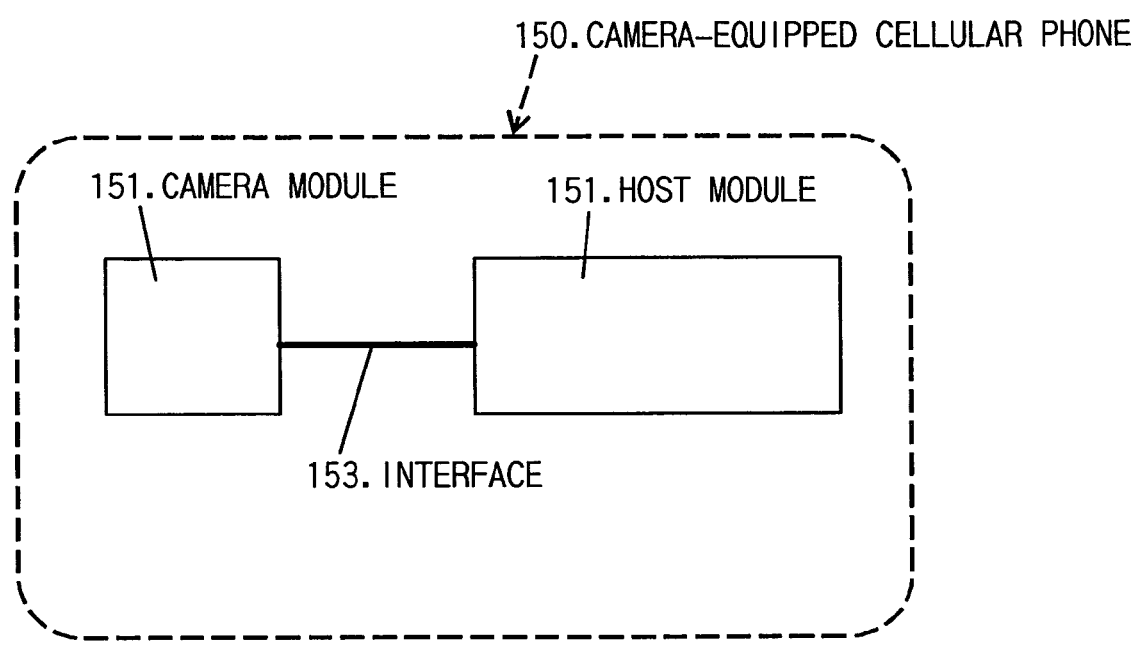
FIG. 8 is a block diagram of a conventional camera-equipped cellular phone.

FIG. 6 is a hardware block diagram showing a third embodiment of a camera-equipped cellular phone to which the present invention is applied. The camera-equipped cellular phone of the present embodiment is also configured by a camera module 90 and a host module 91.

The camera module 90 is provided with an LED light 92, a lens 93, a solid-state image pickup device 94, an A/D converter 95, an image data creator 97, a JPEG compressor 98, a data interface 103, and a control interface 104 or the like. In addition, the camera module 90 is provided with a CPU 100 connected to the image data creator 97 and the JPEG compressor 98 through a bus 101. To the bus 101, a buffer memory 99 is also connected. The CPU 100 is further connected to the LED light 92, the solid-state image pickup device 94, and the A/D converter 95 through the bus 102. The image data creator 97, the JPEG compressor 98, the buffer memory 99, the CPU 100, the buses 101 and 102, and the interfaces 103 and 104 are provided in one chip as a camera LSI 96.

The operations of the solid-state image pickup device 94, the A/D converter 95, the image data creator 97, and the JPEG compressor 98 with respect to the creation and the compression of the image data are the same as those of the embodiment 1. In addition, it is also the same that the camera-equipped cellular phone 1 is provided with the photograph mode and the preview mode. In the preview mode, the camera module 90 newly performs the data collection by the solid-state image pickup device 94 at each passage of a predetermined time interval, for example, every 1/10 second, namely, perform the conversion of light into electric signals by the solid-state image pickup device 94 to create new image data for display. The uncompressed image data for display among them is transmitted to the camera module 91 through the data interface 103. However, in the preview mode, the CPU 100 may issue an order to the JPEG compressor 98 through the bus 101 and may control the JPEG compressor 98 so as to compress one file of the image data for display every time the predetermined amount of the image data for display is created. For example, if three files of the image data for display is created, one file among them is compressed by the JPEG compressor 98. The CPU 100 may measure the data size of the compressed image data for display and may save it in the buffer memory 99 together with the quality factor and the quantization table used for the compression. The compressed image data for display is discarded when the size of the data is completely measured, so that the compressed image data for display is not outputted from the camera module to the outside. The CPU 100 may control the JPEG compressor 98 so as to compress the image data for display of a new frame by using a different quality factor or a different quantization table, respectively. Thus, the data size after each case of compression using a plurality of different quality factor and quantization table is measured, and comparing these combinations, the CPU 100 decides the quality factor and the quantization table to attain the desired data size. In addition, can be inferred from the above descriptions, since the size of the buffer memory 99 is sufficient if it can store a plurality of quality factors, quantization tables, and data sizes, large size is not necessary.

In the photograph mode, the CPU 100 may control the JPEG compressor 98 so as to compress the image data for saving by using the quality factor and the quantization table to attain the desired data size which was determined in the preview mode. In other words, the CPU 100 may decide the compression rate of the image data to be used for the photographing, namely, the compression rate for saving by deciding the quality factor and the quantization table that are used for photographing.

The CPU 100 may receive a message based order from a CPU 111 of the host module 91 to be described later through the control interface 104, and interpreting this message based order, the CPU 100 may control the component parts of the camera module 90 such as the solid-state image pickup device 94 and the image data creator 97 or the like. Thus, if the independent CPU 100 is provided to the camera module 90 and the CPU 100 controls the component parts of the camera module 90 by interpreting the message based order received by the CPU from the outside, the control software of the camera module can be independent from the control software of the host module. Thus, the present embodiment has the advantages such that the control software of the host module and the camera module can be independently developed and the control software can be easily updated.

Next, the hardware structure and the operation of the host module 91 will be described. The host module 91 is configured by a data interface 109, a control interface 110, a CPU 111, a bus 108, an interface 112 for a temporal storage unit, a temporal storage unit 113, an interface 114 for a main storage unit, a main storage unit 115, an interface 116 for a display unit, a display unit 117, an interface 118 for a keyboard, a keyboard 119, a base band control part 106, and an antenna part 107 or the like. Among these devices, the CPU 111, the bus 108, and the interfaces 109, 110, 112, 114, 116 and 118 are provided in one chip as the application engine 105. The base band control part 106 handles the function for sending and receiving of the telephone call and has the specialized CPU. The application engine 105 handles the functions other than that for sending and receiving of the telephone call and may also handle the function of control of the keyboard 119, a game, reproduction of music, and preparing a schedule or the like in addition to the processing of the image data to be transmitted from the camera module 90.

In the preview mode, the only data transmitted from the camera module 90 is uncompressed image data for display. The data inputted in the host module 91 through the data interface 109 is temporarily saved in the temporal storage unit 113. The CPU 111 may read this data from the temporal storage unit 113 and may perform predetermined processing to display it on the display screen of the display unit 117. When in the photograph mode, the data transmitted from the camera module 90 is the compressed image data for saving. The image data for saving is saved in the temporal storage unit 113 temporarily, and then it is saved in the main storage unit 115.

The above-described embodiments are merely examples of putting the present invention in practice, and of course various embodiments not exceeding the scope of the present invention are conceivable.

What is claimed is:

1. A digital photographic device comprising:
   an image data creator that creates a first type of image data for test shooting and creates a second type of image data for real shooting;
   a compressor that compresses the image data in a predetermined compression format; and
   a processor that processes the data;

wherein the compressor has one or plural compression parameters relating to a compression rate;

the image data creator newly supplies the first type of image data to the compressor one file after another by newly performing the test shooting one after another;

the compressor compresses at least two files among the continuously supplied first type of image data using values of the compression parameters which are different from each other;

the processor decides the value of the compression parameter to be used for the second type of image data according to a predetermined standard, based on two and more files of first type image data that are compressed using values of the compression parameters which are different from each other; and further, the processor sets the value of the compression parameter of the compressor at the decided value.

2. The digital photographic device according to claim 1, wherein the first type of data has a lower resolution than that of the second type of image data.

3. The digital photographic device according to claim 1, wherein any one of the one or plural compression parameters is a matrix.

4. The digital photographic device according to claim 1, wherein the predetermined standard relates to a compression rate.

5. The digital photographic device according to claim 1, wherein the predetermined standard relates to a compression rate estimation table to estimate the difference between compression rates in the test shooting image data and the compression rate of the image data for saving, caused chiefly by the difference of the resolution of these two images.

6. The digital photographic device according to claim 1, comprising a display unit,
    wherein the processor displays the first type of image data, not compressed by the compressor, on the display unit.

7. The digital photographic device according to claim 1, comprising a main storage unit to store the data,
    wherein the data creator supplies the second type of image data to the compressor for the real shooting;
    the compressor compresses the second type of image data to be supplied at the decided value of the parameter; and
    the processor saves the compressed second type of image data in the main storage unit.

8. The digital photographic device according to claim 1, wherein the predetermined compression system is a JPEG format.

9. The digital photographic device according to claim 8, wherein the one or plural compression parameters include a quantization table or a quality factor.

10. A digital photographic device comprising:
    a camera module including an image data creator that creates a first type of image data for test shooting and a second type of image data having a higher resolution than that of the first type of image data for real shooting, a compressor that compresses the image data in a predetermined compression format, a data output part for transmitting the data to the outside, and a control signal input part for receiving a control signal; and
    a host module including a processor that processes the data, a data input part for receiving the data, and a control signal output part for transmitting a control signal to the camera module;

wherein the compressor has one or plural compression parameters relating to a compression rate, the camera module newly supplies the first type of image data to the compressor one after another by newly performing the test shooting with the image data creator one after another; compresses with the compressor at least two files among the continuously supplied first type of image data using values of the compression parameters which are different from each other; and transmits the compressed files of first type image data to the host module through the data output part one after another; and the host module receives the compressed first type of image data through the data input part one after another; decides with the processor on the value of the compression parameter to be used for the second type of image data according to a predetermined standard based on two and more files of first type image data that are compressed using values of the compression parameters which are different from each other,; and further, transmits a control signal through the control signal output part in order to set the value of the compression parameter of the compressor at the value decided by the processor.

11. The digital photographic device according to claim 10, wherein any one of the one or plural compression parameters is a matrix.

12. The digital photographic device according to claim 10, wherein the predetermined standard relates to a compression rate.

13. The digital photographic device according to claim 10,
    wherein the host module comprises a display unit and a main storage unit for storing the data;
    the camera module transmits the first type of image data, not compressed by the compressor, to the host module through the data output part one after another;
    the host module receives the uncompressed first type of image data through the data input part one after another and the processor displays the uncompressed first type of image data on the display unit;
    further, the camera module supplies the second type of image data for the real shooting created by the image data creator to the compressor; compresses with the compressor the supplied second type of image data using the value of the compression parameter that has been determined; and transmits the compressed second type of image data to the host module through the data output part; and
    the host module receives the compressed second type of image data through the data input part and the processor saves the compressed second type of image data in the main storage unit.

14. A digital photographic device comprising:
    a camera module including an image data creator that creates a first type of image data for test shooting and a second type of image data having a higher resolution than that of the first type of image data for real shooting, a first compressor that compresses the image data in a predetermined compression format, a data output part for transmitting the data to the outside, and a control signal input part for receiving a control signal; and
    a host module including a processor that processes the data, a data input part for receiving the data, and a control signal output part for transmitting a control signal to the camera module;

wherein the host module comprises a second compressor;
the compressor has one or plural compression parameters relating to a compression rate;
the camera module newly creates the files of the first type of image data one after another by newly performing the test shooting one after another by the image data creator, and transmits the continuously created files of the first type of image data to the host module through the data output part one after another;
the host module receives the created files of the first type of image data through the data input part one after another; compresses with the second compressor at least two files among the continuously received first type of image data using values of the compression parameters which are different from each other; decides with the processor the value of the compression parameter to be used for the second type of image data according to a predetermined standard, based on two and more files of first type image data that are compressed using values of compression parameters which are different from each other; and further, transmits a control signal through the control signal output part in order to set the value of the compression parameter of the first compressor to be the value decided by the processor.

15. The digital photographic device according to claim 14, wherein any one of the one or plural compression parameters is a matrix.

16. The digital photographic device according to claim 14, wherein the predetermined standard relates to a compression rate.

17. The digital photographic device according to claim 14, wherein the second compressor is realized by the same hardware as that of the processor.

18. The digital photographic device according to claim 14,
wherein the host module comprises a display unit and a main storage unit for storing the data and displays a file of the first type of image data that is not compressed by the compressor from among the continuously received first type of image data, on the display unit;
further, the camera module supplies the second type of image data for the real shooting created by the image data creator to the first compressor; compresses with the first compressor the supplied second type of image data using the decided value of the compression parameter; and transmits the compressed second type of image data to the host module through the data output part; and
the host module receives the compressed second type of image data through the data input part, and the processor saves the compressed second type of image data in the main storage unit.

19. The digital photographic device according to claim 18, wherein any one of the one or plural compression parameters is a matrix.

20. The digital photographic device according to claim 18, wherein the predetermined standard relates to a compression rate.

21. The digital photographic device according to claim 18,
wherein the host module comprises a display unit and a main storage unit for storing the data;
the camera module transmits the files of the first type of image data that are not compressed by the compressor to the host module through the data output part one after another;
the host module receives the files of the first type of image data that are not compressed, through the data input part one after another, and the first processor displays the first type of image data that is not compressed, on the display unit;
further, the camera module supplies the second type of image data for the real shooting created by the image data creator to the compressor; compresses with the compressor the supplied second type of image data using the decided value of the compression parameter; and transmits the compressed second type of image data to the host module through the data output part; and
the host module receives the compressed second type of image data through the data input part, and the first processor saves the compressed second type of image data in the main storage unit.

22. The method of deciding a value of a compression parameter according to claim 21,
wherein the first type of image data has a lower resolution than that of the second type of image data.

23. The method of deciding a value of a compression parameter according to claim 21,
wherein the digital photographic device has plural compression parameters that are different from each other.

24. The method of deciding a value of a compression parameter according to claim 21, wherein any one of the one or plural compression parameters is a matrix.

25. The method of deciding a value of a compression parameter according to claim 21, wherein the predetermined standard relates to a compression rate.

26. A digital photographic device comprising:
a camera module including an image data creator that creates a first type of image data for test shooting and a second type of image data having a higher resolution than that of the first type of image data, for real shooting, a compressor that compresses the image data in a predetermined compression format, and a data output part for transmitting the data to the outside; and
a host module including a first processor that processes the data and a data input part for receiving the data;
wherein the camera module comprises a second processor that processes the data;
the compressor has one or plural compression parameters relating to a compression rate;
the camera module newly supplies files of the first type of image data to the compressor one after another by newly performing the test shooting one after another with the image data creator; compresses with the compressor at least two files among the continuously supplied first type of image data using values of the compression parameters which are different from each other; decides with the second processor the value of the compression parameter to be used for the second type of image data according to a predetermined standard, based on two and more files of first type image data that are compressed using values of compression parameters which are different from each other; and further, sets the value of the compression parameter of the compressor to be that decided by the second processor.

27. A method of deciding a value of a compression parameter in the case of compressing a second type of image data in a digital photographic device which creates a first type of image data for test shooting; creates the second type of image data for real shooting; compresses the created second type of image data; and saves the compressed second type of image data; comprising:

newly creating files of the first type of image data one after another by newly performing the test shooting one after another;

compressing at least two files among the continuously created first type of image data using values of compression parameters which are different from each other; and deciding the value of the compression parameter to be used for the second type of image data according to a predetermined standard, based on two and more files of first type image data that are compressed using values of the compression parameters which are different from each other.

* * * * *